United States Patent [19]
Donze

[11] Patent Number: 4,837,672
[45] Date of Patent: Jun. 6, 1989

[54] SWITCHED MODE POWER SUPPLY

[75] Inventor: Jerry L. Donze, Arvada, Colo.

[73] Assignee: Storage Technology Corporation, Louisville, Colo.

[21] Appl. No.: 238,864

[22] Filed: Aug. 30, 1988

[51] Int. Cl.⁴ .......................................... H02M 7/04
[52] U.S. Cl. .................................. 363/143; 363/53; 363/126; 361/87
[58] Field of Search .......................... 363/50, 52–53, 363/59–61, 126, 142, 143; 323/299; 361/78, 79, 87

[56] References Cited

U.S. PATENT DOCUMENTS

| | | | |
|---|---|---|---|
| 3,348,132 | 10/1967 | Moyer | 323/299 |
| 3,466,527 | 9/1969 | Chun | 363/52 |
| 3,900,787 | 8/1975 | Koster | 363/61 |
| 4,212,054 | 7/1980 | Seki | 363/53 |
| 4,415,964 | 11/1983 | Scharfe, Jr. | 363/142 |
| 4,590,546 | 5/1986 | Maile | 363/142 |
| 4,628,431 | 12/1986 | Kayser | 363/53 |
| 4,654,538 | 3/1987 | Lethellier | 363/143 |
| 4,665,323 | 5/1987 | Russell et al. | 363/60 |
| 4,780,805 | 10/1988 | Chewuk et al. | 363/143 |

OTHER PUBLICATIONS

"110 Vac/200Vac Detector Switch", IBM Technical Disclosure Bulletin, vol. 27, No. 10B, Mar. 1985, pp. 6214–6215.

"Automatic Input-Selecting Power Supply", IBM Technical Disclosure Bulletin, vol. 28, No. 3, Aug. 1985, pp. 1246–1247.

Primary Examiner—Peter S. Wong
Attorney, Agent, or Firm—Dorr, Carson, Sloan & Peterson

[57] ABSTRACT

An electronically switched power supply that automatically adjusts its operation to produce a fixed output voltage as input voltages of different magnitudes are applied at different times and which has a circuit breaker and circuit breaker control circuitry which provides circuit breaker protection at a fixed output current as the different input voltages are applied.

14 Claims, 1 Drawing Sheet

SWITCHED MODE POWER SUPPLY

BACKGROUND OF THE INVENTION

1. Field of the Invention

This invention relates to a power supply and more particularly to a power supply which automatically generates the same output voltage when voltages of substantially different magnitudes are applied to its input. The invention also relates to a power supply having a circuit breaker on its input side which provides reliable protection at a single specified power level as the different voltages are applied to the input of the power supply.

2. Backqround of the Invention

It is known to provide power supplies that can operate from different voltages sources at different times, such as for example from 120 and 220 volts. It is desirable that these power supplies automatically alter their operation to generate essentially the same output voltage as the different input voltages are applied. This capability eliminates the necessity of manual intervention to adjust switches, straps, etc. as the different voltages are applied.

Power supplies which perform this operation automatically are shown in U.S. Pat. Nos. 3,348,132, 3,900,787, 4,415,964, 4,590,546, 4,654,538, and 4,665,323. Although all of these patents disclose power supply circuits which automatically adapt their operation to the receipt of different input voltages, none of these disclose a power supply that is protected by a single circuit breaker on its input side that trips when a single fixed output current is exceeded as the different input voltages are applied. In other words, a circuit breaker should trip at a single fixed output current regardless of the magnitude of the voltage applied to the input of the power supply. Thus, if a power supply has a circuit breaker which trips when the input current exceeds 10 amperes at 110 volts, in order to provide the same protection on the output side for a 220 volt input, the circuit breaker should trip when the input current exceeds 5 amperes.

It is desirable to provide quality equipment with circuit breakers in order to protect both the power supply as well as the load to which the power supply is connected. Although power supplies are available which automatically adapt their operation to input voltages of different magnitudes, the unavailability of circuit breakers on the input side which trip at the same output power level regardless of the input voltage, requires manual operations such as the adjustment of straps, the setting of switches, etc. in order to adapt the operation of the circuit breaker to the reception of the different magnitudes of input voltages. The necessity of this manual intervention is a problem in that it is easy to overlook a change in input voltages and thereby damage expensive components or systems. This risk is substantially increased where the input voltage changes frequently and/or rapidly without advance warning or notification to the operator of equipment.

SUMMARY OF THE INVENTION

The above and other disadvantages of the prior art are overcome and a technical advance is achieved by the present invention which provides a power supply which automatically adjusts its operation to produce the same output voltage as different input voltages are received. The power supply of the invention also comprises a circuit breaker on the input side and circuit breaker control circuitry which adjusts the characteristics of the circuit breaker so that it trips a fixed output current level as different input voltages are applied. This permits the output of the power supply and the apparatus to which the power supply is connected to be protected since the circuit breaker trips when a given output current is exceeded irrespective of the magnitude of the voltage applied to the input of the power supply.

The circuit of the present invention includes a circuit breaker having a tapped control coil, a diode bridge, a pair of series connected capacitors across the DC output of the bridge, a voltage sense amplifier connected across the DC output, and relays having contacts which cause the bridge to operate either as a full wave rectifier from 220 volts or as a voltage doubler from 120 volts. The relay contacts cause all of the windings of the circuit breaker control coil to be used when the circuit is operated from 220 volts and only a portion of the windings to be used when the diodes and the capacitors operate as a voltage doubler as 120 volts is applied to the power supply.

In other words, when 220 volts is applied, the full winding of the circuit breaker control coil is in series with the AC input of the diode bridge. The output of the diode bridge operating as a full wave rectifier is then applied across the two series connected capacitors. The voltage sense amplifier senses the output voltage of the bridge and causes the circuit to remain in this state as long as 220 volts remains applied. When the power supply is connected to 120 volts, the voltage sense amplifier initially detects a lowered output voltage at the output of the full wave diode bridge and operates the relays and their contacts so that the diodes and the capacitors operate as a voltage doubler to provide essentially the same output voltage. At the same time, the operation of the relay contacts alters the connections to the circuit breaker control coil so that only a part of the coil is connected in series with the AC input of the diode bridge. This permits the circuit breaker to trip at a higher input current level for 120 volts than it does for 220 volts. In other words, if the circuit breaker is designed so that it trips when the input current exceeds 5 amps at 220 volts, then the use of only a part of the control coil for 110 volts permits the circuit breaker to trip when the input current exceeds 10 amps.

It can be thus seen that the power supply of the present invention overcomes the problems of the prior art and provides automatic circuit breaker protection at a fixed output level in response to the reception of different magnitudes of input voltages.

BRIEF DESCRIPTION OF THE DRAWING

The above and other advantages of the invention may be better understood from a reading of the following description thereof taken in conjunction with the drawing in which.

DETAILED DESCRIPTION OF THE PREFERRED EXEMPLARY EMBODIMENT

Figure 1:
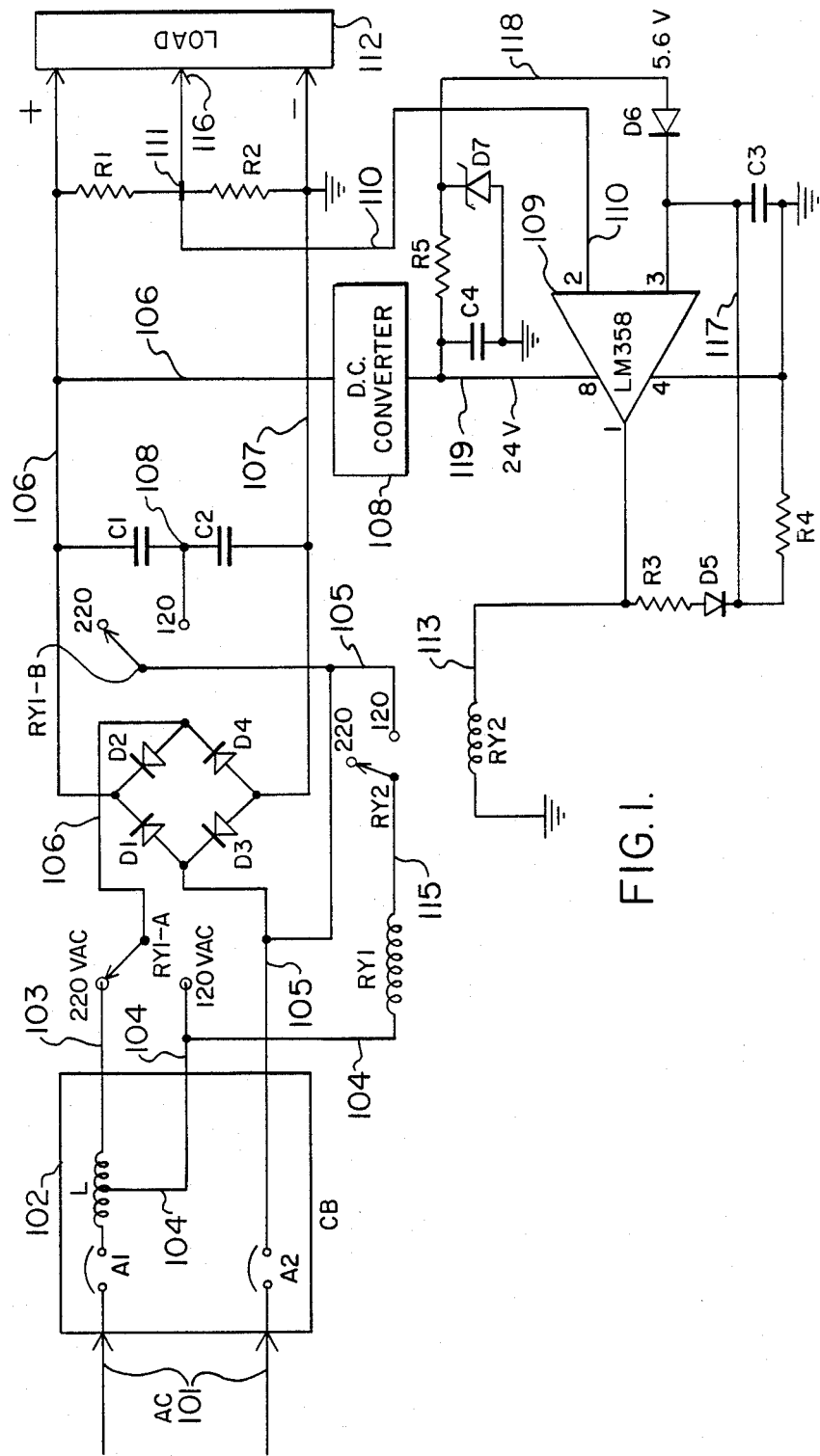
FIG. 1 is a schematic drawing of one possible exemplary embodiment of the invention.

FIG. 1 comprises a schematic diagram of the electronically switched power supply of the present invention. The power supply comprises a circuit breaker 102, a diode bridge having diodes D1 through D4, a pair of series connected capacitors C1 and C2 connected across the DC output of the bridge, a voltage sense amplifier 109, and relays RY1 and RY2. These relays and their contacts provide automatic circuit breaker protection at a constant output current and power level as different input voltages, such as 120 and 220 volts, are applied to the input of the power supply at different times.

The AC input voltage is applied to input conductors 101 which extend to contacts A1 and A2 of circuit breaker 102. The lower side of the AC line is extended through circuit breaker contacts A2 and over path 105 to the left hand AC input of the diode bridge. The upper side of the AC line is extended through circuit breaker contacts A1, the entirety of control coil L and over path 103 to the 220 volt relay contacts RY1-A and, from there, over path 106 to the right hand AC input of the diode bridge.

The circuit is normally in its 220 volt position in which both relays RY1 and RY2 are deenergized so that their contacts are in the position shown on FIG. 1. In this state, 220 volts AC is applied to the AC inputs of the diode bridge and a correspondingly high DC voltage is applied to the the bridge on conductors 106 and 107. Capacitors C1 and C2 are connected in series between conductors 106 and 107. The circuit remains in this state with the relays RY1 and RY2 de-energized as long as 220 volts AC remains applied to the input conductors 101.

Conductor 106 also extends to the DC convertor 108 whose output is connected over path 119 to pin 8 of the voltage DC sense amplifier 109. This amplifier monitors the level of the DC output voltage at the junction of resistors R1 and R2 which are connected in series across the output conductors 106 and 107. Amplifier 109 causes relay RY2 to remain de-energized as long as the voltage on path 110 remains relatively high.

Let it be assumed that the circuit of FIG. 1 is disconnected from 220 volts and is connected to a 120 volt AC line. In this case, the voltage sense amplifier 109 initially and briefly detects a far lower voltage on conductor 110 as the full wave diode bridge receives only 120 volts on its AC inputs. Amplifier 109 operates the coil of relay RY2 via path 113 when it senses this lower voltage. The contacts of relay RY2 move from their 220 volt to their 120 volt position so that the coil of relay RY1 is connected on its right side to the lower side of the AC line on path 105 and is connected on its left side to the upper side of the AC input on a tap of control coil L via path 104. This connection supplies 120 volts to the winding of relay RY1 which now operates and moves its contacts RY1-A and RY1-B from their 220 volt to their 120 volt position. The operation of relay contacts RY1-A disconnects the right hand AC input of the diode bridge from the right side of control coil L and connects it to the middle tap on the coil via path 104. This connection causes the AC input current for the diode bridge to flow through only a portion of the coil L for 120 volts rather than through all of the coil as was the case for the 220 volt condition. Since only a portion of the coil is now used, this permits the coil to carry a proportionally higher current for the 120 volt state before it trips.

The operation of relay contacts RY1-B connects the mid-point of capacitors C1 and C2 to the lower side of the AC line on path 105. This connection causes diodes D2 and D4 and capacitors C1 and C2 to function as a voltage doubler so that essentially the same output voltage is generated across conductors 106 and 107 for the 120 volt state as is the case for the 220 volt state. The reason for this is that the power supply operates as a full wave rectifier for the 220 volt state and operates as a voltage doubler for the 120 volt state.

Output conductors 106 and 107 extend to the inputs of load 112. Conductor 116 also extends to load 112 in order to provide load 112 with the same voltage sense information that is applied over path 110 to sense amplifier 109. If desired, load 112 may be equipped with control circuitry which permits the output voltages generated by the power supply on paths 106 and 107 to be connected to the remainder of the circuitry within load 112 only if the voltage generated by the power supply is of the required magnitude and is neither too high nor too low. This control circuitry protects the remainder of the load in the event that the AC input applied to conductors 101 is substantially less than 120 volts, is substantially greater than 220 volts or is a substantially greater than 120 volts and less than 220 volts. An input voltage of substantially less than 110 volts AC would produce an unacceptable low voltage to the input of load 112. A voltage in excess of 220 volts AC on the input of the power supply would generate an unacceptably high voltage at the input of load 112. An AC input intermediate 120 and 220 volts would produce an unacceptable intermediate level of voltage on load 112. All of these unacceptable voltage levels could possibly result in damage to the sensitive equipment that comprises load 112 and it is often desirable to protect load 112 by appropriate control circuitry which comprises no part of the invention.

The DC convertor 108 comprises standard circuitry such as resistors, capacitors, zener diodes and the like which receives the DC voltage on path 106 and applies 24 volts DC to its output. The output of the DC convertor 108 appears on path 119 which applies 24 volts to pin 8 of the LM358 operational amplifier 109. The 24 volt potential on path 119 is also applied to the capacitor C4, resistor R5, and zener diode D7 combination. These three elements provide another DC convertor which receives the 24 volt input on path 119 and provides an output of approximately 5.6 volts DC on path 118 This 5.6 volt DC potential is applied through diode D6 to the pin 3 input of the LM358 operational amplifier 109. This provides a steady state DC reference potential on the pin 3 input. The application of the 5.6 volt potential on pin 3 is delayed briefly by resistor R5 and capacitor C3. This delay prevents the operational amplifier 109 and relays RY2 and RY1 briefly during power up condition in order to prevent circuit instabilities. The pin 2 input of operational amplifier 109 is connected by path 110 to the junction 111 of resistors R1 and R2. Path 110 thereby applies a potential to the pin 2 input that is proportional to the magnitude of the DC potential at the output of the diode bridge on path 106. When the power supply is connected to 220 volts, the DC output generated by the rectifier on path 106 is sufficiently high so that a correspondingly sufficiently high potential is applied to the pin 2 input of the operational amplifier so that its output on pin 1 does not operate relay RY2. The circuitry of FIG. 1 remains in the state shown on FIG. 1 as long as the input of the rectifier is connected to 220 volts.

When the rectifier of FIG. 1 is connected to 120 volts, a much lower DC voltage initially appears on path 106 and on pin 2 of the operational amplifier. This lower potential is sensed by the amplifier and in a matter of milliseconds it generates a current on its output to operate relay RY2. Relay RY2 operates and moves its contacts to the 120 volt position to operate relay R1. Contacts RY1-B now cause the rectifier to act as a voltage doubler. Contacts RY1-A cause only a portion of the turns on the control coil L of the circuit breaker to be used.

A high potential is again applied to path 106 and to pin 2 of the operational amplifier when the circuit operates as a voltage doubler. However, resistors R3 and R4, capacitor C3, and diode D5, cause the operational amplifier 109 to act as a latch so that it remains in the same conductive condition it was in when it first sensed the low voltage on its pin 2 and caused relay RY2 to operate. Therefore, the subsequent application of a higher potential on pin 2 of the operational amplifier when the power supply operates as a voltage doubler does not effect any new circuit operations within operational amplifier LM358. Instead, it remains in its latched state and holds relay RY2 operated and, in turn, relay RY1 operated as long as the power supply remains connected to a 120 volt AC source.

It can therefore be seen from the above that the circuit of the present invention comprises an automatically switched power supply which can operate from either 120 or 220 volts while providing automatic circuit breaker operation at a fixed output current.

While a preferred embodiment of the present invention has been shown, it is to be expressly understood that modifications and changes may be made thereto and that the present invention is set forth in the following claims.

I claim:
1. In a power supply:
an input side,
an output side,
an ac input,
a rectifier,
a circuit breaker on said input side connected in series between said ac input and said rectifier,
means for operating said rectifier as a full wave rectifier to generate a relatively high dc potential on said output side in response to the application of a relatively high ac potential to said ac input,
means for subsequently operating said rectifier as a voltage doubler to generate said relatively high dc potential on said output side in response to the application of a relatively low ac potential to said ac input, and
means for controlling said circuit breaker to trip at an input current corresponding to a fixed output current as said relatively high and relatively low ac potentials are applied at different times to said ac input.

2. The power supply of claim 1 wherein said means for controlling said circuit breaker comprises:
a control coil for said circuit breaker, and
means for controlling said coil so that said circuit breaker trips at a lower current when said relatively high ac potential is applied and at a higher current when said relatively low ac potential is applied to said ac input.

3. The power supply of claim 2 wherein said coil has a tap connected to said coil intermediate a first end and a second end of said coil and wherein said means for controlling said coil comprises:
means for applying said relatively high ac potential to said rectifier in series with the entirety of said coil, and
means for applying said relatively low ac potential to said rectifier in series with only the portion of said coil comprising one end of said coil and said tap.

4. The power supply of claim 3 wherein said means for controlling said coil further comprises:
means for monitoring the dc voltage generated by said rectifier,
said monitoring means being responsive to said relatively high dc potential on said output side when said relatively high ac potential is applied to said ac input for operating said rectifier as a full wave rectifier and for extending said relatively high ac potential to said rectifier in series with the entirety of said coil, and
said monitoring means being responsive to a lower dc potential on said output when said lower ac potential is applied to said ac input for operating said rectifier as a voltage doubler and for extending said relatively low ac potential on said ac input to said diodes in series with only the portion of said coil comprising said tap and one end of said coil.

5. The power supply of claim 4 wherein said means for controlling said coil further comprises:
relays operated by said monitoring means in response to said detection of said low dc output voltage, and
contacts on said relays responsive to said operation of said relays for operating said rectifier as a voltage doubler and for connecting only said portion of said coil in series with said ac input to said rectifier.

6. In a power supply:
an ac input,
a rectifier,
a circuit breaker having a control coil normally connected in series between said ac input and said rectifier,
said coil having a tap connected to said coil intermediate a first and a second end of said coil,
means for monitoring the dc voltage generated by said rectifier,
relays having contacts,
means including said monitoring means for controlling said relays to operate said rectifier as a full wave rectifier to generate a relatively high dc potential on said output side in response to the application of a relatively high ac potential to said ac input,
means including said monitoring means for controlling said relays to operate said rectifier as a voltage doubler to generate said relatively high dc potential on said output side in response to the application of a relatively low ac potential to said ac input, and
means including said monitoring means and said relays for controlling said coil so that said circuit breaker trips at an input current corresponding to a fixed output current as said relatively high and relatively low ac potentials are applied at different times to said ac input.

7. The power supply of claim 6 wherein said means for controlling said coil comprises:
means for controlling said coil so that said circuit breaker trips at a lower current when said relatively high ac potential is applied and at a higher current when said relatively low ac potential is applied to said ac input.

8. The power supply of claim 7 wherein said means for controlling said coil further comprises:

means including said relays for applying said relatively high ac potential to said rectifier in series with the entirety of said coil, said monitoring means being responsive to a lower dc potential on said output when said lower ac potential is applied to said ac input to operate said relays, and means including said operate relays for applying said relatively low ac potential to said rectifier in series with only the portion of said coil comprising one end of said coil and said tap.

9. In a power supply:
an input side,
an output side,
an ac input,
a plurality of diodes,
a circuit breaker having a coil on said input side with the entirety of said coil being normally connected in series between said ac input and said diodes,
a tap on said coil connected to said coil intermediate a first and a second end of said coil,
a plurality of capacitors connected to said diodes, voltage monitoring means and relays for operating said diodes and said capacitors as a full wave rectifier to generate a relatively high dc potential on said output side in response to the application of a relatively high ac potential to said ac input,
said voltage monitoring means and said relays being responsive to the application of a relatively low ac potential to said ac input for subsequently operating said diodes and said capacitors as a voltage doubler to generate said relatively high dc potential on said output side,
said relays being operable under control of said voltage monitoring means for controlling said coil to apply said relatively high ac potential to said diodes in series with the entirety of said coil and apply said relatively low ac potential to said diodes in series with only the portion of said coil comprising one end of said coil and said tap, and
said voltage monitoring means and said relays and said control coil being effective for controlling said circuit breaker to trip at an input current corresponding to a fixed output current as said relatively high and relatively low ac potentials are applied at different times to said ac input.

10. A method of operating a power supply having an input side, an output side, an ac input, a rectifier, and a circuit breaker on said input side normally connected in series between said ac input and said rectifier, said method comprising the steps of:
operating said rectifier as a full wave rectifier to generate a relatively high dc potential on said output side in response to the application of a relatively high ac potential to said ac input, subsequently operating said rectifier as a voltage doubler to generate said relatively high dc potential on said output side in response to the application of a relatively low ac potential to said ac input, and
controlling said circuit breaker to trip at an input current corresponding to a fixed output current as said relatively high and relatively low ac potentials are applied at different times to said ac input.

11. The method of claim 10 wherein said circuit breaker comprises:
a control coil for said circuit breaker and wherein said method further comprises the step of:
controlling said coil so that said circuit breaker trips at a lower current when said relatively high ac potential is applied and at a higher current when said relatively low ac potential is applied to said ac input.

12. The method of claim 11 wherein said coil has a tap connected to said coil intermediate a first end and a second end of said coil, and wherein said method further comprises the steps of:
applying said relatively high ac potential to said rectifier in series with the entirety of said coil, and
applying said relatively low ac potential to said rectifier in series with only the portion of said coil comprising one end of said coil and said tap.

13. The method of claim 12 wherein said step of controlling said coil further comprises:
monitoring the dc voltage generated by said rectifier,
responding to said relatively high dc potential on said output side when said relatively high ac potential is applied to said ac input for operating said rectifier as a full wave rectifier and for extending said relatively high ac potential to said rectifier in series with the entirety of said control coil, and
responding to a lower dc potential on said output when said lower ac potential is applied to said ac input for operating said rectifier as a voltage doubler and for extending said relatively low ac potential on said ac input to said diodes in series with only the portion of said coil comprising said tap and one end of said coil.

14. The method of claim 13 wherein said step of controlling said coil further comprises:
operating relays in response to said detection of said low dc output voltage, and
operating contacts on said relays in response to said operation of said relays to operate said rectifier as a voltage doubler and for connecting only said portion of said coil comprising one end and said tap in series with said ac input to said rectifier.

* * * * *